Patented Oct. 12, 1943

2,331,308

UNITED STATES PATENT OFFICE 2,331,308

FOOD PRODUCT AND PROCESS OF MAKING SAME

Charles R. Cooper, San Francisco, Calif., assignor of one-half to himself and one-half to Augusta S. Cooper, both of San Francisco, Calif., as joint tenants No Drawing. Application January 24, 1941, Serial No. 375,857

2 Claims. (Cl. 99—144)

This invention relates to processes for preparing foodstuffs and products resulting therefrom, and more particularly to processes of preparing foodstuffs for use as catsup and like fluid condiment bases and products produced thereby.

The present invention is an improvement upon the process and product of my United States Patent No. 2,145,108, wherein I disclose and claim the use of beet pulp in the manufacture of an improved catsup product. It is well established that the term catsup is generic and is not confined to products wherein the solid content is substantially wholly tomato pulp. In that patent, although the invention and claims cover the use of any beet pulp, I specifically describe only the use of red beet pulp as the preferred embodiment of the invention.

In most countries, the customary base for catsup is red tomato pulp because of its economy, color and flavor, the latter lending itself readily to seasoning and spicing. Pulped red tomato comprises a catsup base averaging approximately 6 per cent solids, and to concentrate this pulp to the desired consistency of about 15 per cent solids, which is the approximate density ordinarily used in Fancy catsup, a relatively long and expensive period of concentration by heat is necessary. This long and expensive period of concentration or cooking has a deleterious effect on the color and flavor, due partly to oxidation.

Furthermore, even in the same season of the year, or in different years, and in different localities, it is not always possible to secure tomatoes of like and uniform color. Consequently there is considerable lack of uniformity in the tomato pulp color and resulting catsup products.

Commercial grading of catsup products depends in vital measure upon color of the products. The United States Department of Agriculture Bureau of Agricultural Economics chart allows a score of 30 out of a total of 100 points for proper color. Catsup grading of 25-30 points on color is designated Fancy as to color. A grading of lower than 25 points on color means that the catsup cannot be designated above United States Standard. For example, even if the catsup is predominantly red and good enough to be rated 21-24 points on color, it cannot be designated above United States Standard regardless of its total score.

With the above in mind, it is a major object of the present invention to provide a novel inexpensive process of preparing a catsup or like fluid condiment base containing red tomato pulp and a mixture of red beet pulp and relatively white or colorless vegetable pulp in such proportion as to obtain a desired color in the final product. Preferably, the colorless vegetable pulp is sugar beet pulp, and the desired color is as good or better than that designated for Fancy tomato catsup by the United States Department of Agriculture.

A further object of the invention is to provide a novel catsup or like fluid condiment base containing a mixture of fresh tomato pulp, red beet pulp and a relatively colorless vegetable pulp such as sugar beet pulp. Preferably these pulps are mixed in the approximate proportions of 40 per cent tomato pulp, 40 per cent sugar beet pulp and 20 per cent red beet pulp to obtain desired color, flavor, consistency and other characteristics.

A further object of the invention is to provide a novel catsup base containing a mixture of tomato, red beet and sugar beet pulps having higher original solid and sugar content, higher mineral content and greater consistency and higher viscosity than fresh tomato pulp, and a lower count of mold filaments, bacteria, yeast and spores and insect fragments than the usual tomato pulp employed in making catsup.

A further object of the invention is to provide a novel process of preparing a catsup product with a minimum of heat treatment wherein the pulp base comprises a mixture of tomato, red beet and sugar beet pulps, in such proportions as to be of desired density without cooking.

Further objects of the invention will presently appear as the description proceeds.

In its preferred embodiment, the invention comprises the manufacture of an improved fluid condiment base comprising a mixture of fresh uncooked tomato pulp, red beet pulp and a white or relatively colorless vegetable pulp such as sugar beet pulp in desired proportions. These pulps are prepared separately by the usual manufacturing steps of pressing and subsequent passing through a cyclone, and are preferably mixed in pulp form in a suitable mixing machine.

In its preferred embodiment, my improved pulp comprises a mixture of 40 percent fresh tomato pulp, 40 per cent sugar beet pulp and 20 percent red beet pulp.

Cost of the above materials necessary for making a desired quantity of my improved pulp base is less than the cost of tomatoes necessary for making the same amount of suitable tomato pulp. The original solid content of my pulp base is much higher than fresh tomato pulp, and the original sugar content of my pulp base is much higher than unsweetened tomato pulp. The mineral content of my pulp base is higher than that of tomato pulp.

My pulp base results in a catsup product which has not only greater consistency and higher viscosity than a catsup product made with a tomato pulp base, but which has a brighter and more attractive red color. Moreover I am enabled to control this color closely and absolutely as will be pointed out.

My pulp base, due to the inclusion of considerable stable, insect-free beet pulp, contains a lower insect fragment count and a lower count of mold filaments, bacteria, yeast and spores than tomato pulp.

The high solid content of my pulp base insures a minimum of heat treatment in the process and results in a product having improved and delightful peculiarities of flavor. This minimum heat treatment combined with the low cost of materials results in marked economy of production and increased plant capacity.

The above aspects and advantages of the invention are set forth separately and in detail below.

Color

The best brands of tomato catsup have good red color. Use of my improved pulp base results in a catsup product having a brighter and more attractive red color than tomato catsup and insures maximum grading for color based on Department of Agriculture standards.

This insurance of maximum color grading is a marked improvement over the uncertain results hitherto obtained in making tomato catsup, and represents an important and beneficial contribution to the art.

A catsup product of unusually good "Fancy" color is obtained from my preferred pulp base comprising 40 per cent fresh tomato pulp, 40 per cent sugar beet pulp and 20 per cent red beet pulp.

Color control

The color of the final catsup product may be varied and controlled absolutely by suitably proportioning the quantity of red beet pulp and correspondingly changing the percentages of the other ingredients. Color control is also affected by the particular variety of red beet employed as some varieties are more red than others.

Although, as above indicated, best results are obtained by compounding approximately 3 parts total beet pulp (red beet pulp and sugar beet pulp) with 2 parts tomato pulp, good results may be obtained by combining these ingredients in approximate proportion as low as 1 part total beet pulp to 3 parts tomato pulp or as high as 3 parts total beet pulp to 1 part tomato pulp.

My invention also includes the discovery that while the preferred ratio of red beet pulp to sugar beet pulp is approximately 1 to 2, good results and suitably colored products are obtained when the ratio of red beet pulp to sugar beet pulp is as high as 2 to 1 and as low as 1 to 9.

As a practical matter these pulp proportions may vary widely within the above limits. The minimum quantity of red beet pulp essential for purposes of the invention is about 2½ per cent of the total pulp base. A lower percentage would accomplish no appreciable variation of the red tomato color. In a base containing this minimum of red beet pulp, I preferably employ 1 part total beet pulp to three parts fresh tomato pulp. The total beet pulp consists of 1 part red beet pulp and 9 parts sugar beet pulp.

The maximum permissible red beet pulp content is about 50 per cent of the pulp base. In a base containing this maximum of red beet pulp, I preferably employ 3 parts total beet pulp to one part fresh tomato pulp. The total beet pulp consists of 2 parts red beet pulp and one part sugar beet pulp.

By changing any of the above proportions and particular variety of red beet employed any intermediate results may be obtained without departing from the spirit of the invention.

The above-described manner of color control is novel and inexpensive and constitutes an extremely important part of the invention.

The color of red beet pulp is substantially uniform during all seasons and different years and the red beet color is exceptionally determinative of the color of the final product even when minimum quantities are employed. Hence, once the ratio of red and sugar beet pulps necessary to produce a desired colored product is determined, the process can be carried out over long periods of time with the assurance that the desired color is being maintained and no color check on each new batch of beets is necessary. The color control of the invention is therefore positive, reliable and accurate.

Solid content

The original solid content of tomato pulp is about 6 per cent, that of red beet pulp about 14 per cent, and that of sugar beet pulp about 26 per cent.

The above-described combined pulp base of the preferred embodiment of the invention has therefore normally about 15.6 per cent original solid content which is sufficient consistency to enable its use in preparation of the final catsup product without preliminary dehydration and cooking.

Sugar content

Sugar is an important and expensive ingredient in all brands of commercial tomato catsup. It has value for flavoring and seasoning, as well as importance in diet. Heretofore, due to the low original sucrose content of tomato pulp, only about 3.5 per cent, it has been necessary to add large quantities of commercial granulated sugar in the manufacture of catsup to obtain desired flavor.

The original sucrose content of sugar beets (about 17–23 per cent) is more than double that of red beets (about 8 per cent) so that employment of a large percentage of sugar beet pulp eliminates or at least permits a substantial reduction in the amount of commercial sugar to be added in making the finished product and thereby considerably reduces the cost of manufacture in this respect. The above described combined pulp base of the preferred embodiment of the invention has an average sucrose content of about 9.4 per cent.

Mineral content

Both sugar beets and red beets have about the same large mineral content (about 4 per cent each) so that the employment of large quantities of beet pulp results in a product providing a substantial source of dietary important minerals.

The mineral content of the pulp base of the preferred embodiment of the invention is about 2.8 per cent as compared to a mineral content of about 1 per cent for tomato pulp.

Consistency

The finished catsup product of my invention is an emulsion of greater density than the usual tomato catsup, due to the co-action of the pulp base ingredients, and fully satisfies the Department of Agriculture specifications for catsup requiring a heavy-bodied product.

Viscosity

My improved catsup product has a higher viscosity than the usual tomato catsup made with a base consisting only of tomato pulp. For example, the usual Fancy grade tomato catsup has a viscosity reading of approximately 300 seconds per 100 revolutions on a Stormer viscosimeter. My product has a viscosity reading of much greater than 500–700 seconds per 100 revolutions using the same conditions of determination as used on Fancy grade tomato catsup values illustrated above, actually about 3000–4000 seconds per 100 revolutions, and 1000 seconds has been heretofore considered ultimate in catsup manufacture. Experiments show that addition of sugar results in a more syrupy product having a thinner Stormer test.

Low cost of material

In carrying out my improved process, the material costs are much less than for ordinary tomato catsup. Beets at present cost only six dollars per ton, while tomatoes cost about twelve dollars per ton. This savings is even greater when the relative solid content of beets and tomatoes is considered. I have computed that the actual saving in material cost of my combined pulp base as compared with the usual tomato pulp base is about 73.1 per cent. By using a combination beet pulp, I am enabled to secure the desired Fancy catsup color or better and at the same time use a maximum of inexpensive material. Further, as explained above, the sugar beet pulp provides a large amount of sugar, thereby cutting down on the amount of expensive granulated sugar necessary for flavoring.

Minimum heat treatment

Because of the high and proper solid content and consistency of my fresh pulp base, the expensive and lengthy concentration process usual in making tomato catsup is eliminated and practically the only heat treatment necessary to make the finished catsup product is that sufficient to cook the product for preservation and blend the flavors of the pulp base, vinegar, added sugar and spices and other substances necessary to obtain an emulsion of desired consistency, viscosity, keeping qualities and flavor. I have found it quite satisfactory to maintain the cooking operation within a temperature range of 140° to 212° F., and preferably about 175° to 180° F. If a very heavy density pulp base is required such can be obtained with minimum heat treatment employing my pulp base.

Employment of minimum heat treatment is economical and time saving, and preserves the flavors of the product.

Economy of production and improved plant capacity

The above-described low cost of materials essential in making my pulp base considerably reduces production costs. Tomatoes are more subject to spoilage in handling and storage than beets so that my process minimizes this hazard.

Elimination of the usual concentration step hitherto necessary for obtaining a base pulp of desired solid content eliminates the time, labor and expensive machinery hitherto required for that purpose in making tomato catsup and thereby results in lower overhead and production costs. The saving in time speeds up the process considerably whereby the plant capacity and production are increased.

Low insect fragment count

Tomatoes in most localities are subject to pin worms and ear worms, and are attractive to vinegar flies and other insects. The United States Department of Agriculture has recognized this infestation of tomatoes as a definite problem and has set minimum standards of insect fragment count which must be attained. Under the Howard Test for Worm and Insect Fragments the maximum count for catsup shall not exceed 30 insect fragments per 200 c. c.

Beets are not subject to such insect infestation, so that use of large percentages of beet pulp in my improved products with consequent reduction of tomato pulp content minimizes the problem of keeping the insect fragment count well under the regulations.

Low count of mold filaments, bacteria, yeast and spores

Federal specification requires that under the Howard test, catsup shall not show mold filaments in over 40 per cent of the microscopic fields; bacteria not over 30,000,000 per c. c.; and yeast and spores not over 30 per $\frac{1}{60}$ c. m.

Because I use a large percentage of beet pulp in my improved product, I obtain a very low count of mold filaments, bacteria, yeast and spores, falling well below the Federal specifications in this respect.

Because of its low bacteria, spore and insect fragment content, my product is outstanding in its compliance with Federal specification requirements and of high dietary value.

Improved flavor

My catsup product has a delicious flavor surpassing that of ordinary tomato catsup. This is due to the combination of ingredients employed and retention of the natural flavors due to the minimum heat treatment necessary in the process. The utilization of the natural sugar in the beets instead of commercial granulated sugar also contributes to improved flavoring.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of making an improved catsup base having an increased natural solid content and viscosity, better color, more natural mineral and sugar content, and less mold filaments, insect fragments, bacteria spores and the like, which consists in combining unconcentrated sugar beet pulp and red beet pulp with unconcentrated tomato pulp so that the ratio of total beet pulp to tomato pulp is no greater than 3 to 1 and not less than 1 to 3 and the ratio of red beet pulp to sugar beet pulp is not greater than 2 to 1 and not less than 1 to 9, and cooking the product within a temperature range of 140° to 212° F. to blend the pulp flavors.

2. The method set forth in claim 1 wherein the proportions of the pulps employed are approximately 40 per cent tomato pulp, 40 per cent sugar beet pulp and 20 per cent red beet pulp.

CHARLES R. COOPER.